United States Patent
Gao et al.

(10) Patent No.: US 7,461,073 B2
(45) Date of Patent: Dec. 2, 2008

(54) CO-CLUSTERING OBJECTS OF HETEROGENEOUS TYPES

(75) Inventors: Bin Gao, Beijing (CN); Tie-Yan Liu, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 11/354,208

(22) Filed: Feb. 14, 2006

(65) Prior Publication Data

US 2007/0192350 A1 Aug. 16, 2007

(51) Int. Cl.
G06F 17/00 (2006.01)
G06F 17/30 (2006.01)
(52) U.S. Cl. ......... 707/100; 707/10; 707/102; 707/104.1; 707/101; 715/530
(58) Field of Classification Search ...... 707/100–104.1, 707/10; 715/530
See application file for complete search history.

(56) References Cited

U.S. PATENT DOCUMENTS

| | | | |
|---|---|---|---|
| 6,263,334 B1 | 7/2001 | Fayyad et al. | |
| 6,269,376 B1 | 7/2001 | Dhillon et al. | |
| 6,560,597 B1 | 5/2003 | Dhillon et al. | |
| 6,581,058 B1 | 6/2003 | Fayyad et al. | |
| 6,976,020 B2 * | 12/2005 | Anthony et al. | 707/6 |
| 7,039,638 B2 | 5/2006 | Zhang et al. | |
| 7,072,891 B2 | 7/2006 | Lee et al. | |
| 7,272,543 B2 * | 9/2007 | Estevez-Schwarz et al. | 703/2 |
| 2003/0069908 A1 * | 4/2003 | Anthony et al. | 707/513 |
| 2003/0084421 A1 * | 5/2003 | Estevez-Schwarz et al. | 716/20 |
| 2003/0154181 A1 | 8/2003 | Liu et al. | |
| 2003/0204484 A1 | 10/2003 | Charpiot et al. | |
| 2005/0015366 A1 * | 1/2005 | Carrasco et al. | 707/3 |
| 2005/0203889 A1 * | 9/2005 | Okubo et al. | 707/3 |
| 2006/0242093 A1 * | 10/2006 | Richardson et al. | 706/15 |

OTHER PUBLICATIONS

"Consistent Bipartite Graph Co-Partitioning for Star-Structured High-Order Heterogeneous Data Co-Clustering"—Bin Gao, Tie-Yan Lie, Xin Zheng, Qian-Sheng Cheng and Wei-Ying Ma—ACM-KDD'05, Aug. 21-24, 2005, Chicago, Illinois pp. 41-50.*

(Continued)

*Primary Examiner*—Jean B. Fleurantin
*Assistant Examiner*—Anh Ly
(74) *Attorney, Agent, or Firm*—Perkins Coie LLP

(57) ABSTRACT

A method and system for high-order co-clustering of objects of heterogeneous types using multiple bipartite graphs is provided. A clustering system represents relationships between objects of a first type and objects of a third type as a first bipartite graph and relationships between objects of a second type and objects of the third type as a second bipartite graph. The clustering system defines an objective function that specifies an objective of the clustering process that combines an objective for the first bipartite graph and an objective for the second bipartite graph. The clustering system solves the objective function and then applies a clustering algorithm such as the K-means algorithm to the solution to identify the clusters of heterogeneous objects.

18 Claims, 7 Drawing Sheets

OTHER PUBLICATIONS

"Relevance search and anomaly detection in bipartie graphs"—Jimeng Sun, Huiming Qu, Deepayan Chakrabarti and Christos Faloutsos—ACM SIGKDD Explorations Newletter—vol. 7, issue Dec. 2, 2005 (pp. 48-55).*

"Solving cluster ensemble problems by bipartite graph partitioning"—Xioali Zhang Fern and Carla E. Brodley—ACM International Conference proceeding Series—ACM 2004, (pp. 36 including 8 pages).*

U.S. Appl. No. 11/621,848, Liu et al.

"SDP Semidefinite Programming," 2 pages, http://www-user.tu-chemnitz.de/~helmberg/semidef.html [last accessed Nov. 29, 2006].

"SDPA Online Introduction," 5 pages, http://grid.r.dendai.ac.jp/sdpa/intro.html [last accessed Jan. 9, 2006].

Bach, Francis R. and Michael I. Jordan, "Learning Spectral Clustering," Neural Info. Processing Systems 16, NIPS 2003, 8 pages.

Baeza-Yates, R. and B. Ribeiro-Neto, "Chapter 2 Modeling," Modern Information Retrieval, © 1999 by the ACM Press, pp. 19-71.

Banerjee, Arindam, Inderjit Dhillon and Dharmendra S. Modha, "A Generalized Maximum Entropy Approach to Bregman Co-clustering and Matrix Approximation," Research Track Poster, KDD'04, Aug. 22-25, 2004, Seattle, Washington, pp. 509-514, © 2004 ACM.

Benson, H.P., "Global Optimization Algorithm for the Nonlinear Sum of Ratios Problem," Journal of Optimization Theory and Applications, vol. 112, No. 1, Jan. 2002, © 2002 Plenum Publishing Corporation, pp. 1-29.

Boyd, Stephen and Lieven Vandenberghe, "Chapters 4.4, 4.6 and 11.6," Convex Optimization, © 2004 Cambridge University Press, pp. 152-160, 167-17 & 596-608.

Cai, Deng et al., "Hierarchical Clustering of WWW Image Search Results Using Visual, Textual and Link Information," MM'04, New York, © 2004 ACM, 8 pages.

Cai, Deng et al., "Organizing WWW Images Based on The Analysis of Page Layout and Web Link Structure," In the 2004 IEEE International Conference on Multimedia and EXPO, © 2004 IEEE, 4 pages.

Chang, Tianhorng. and C. C. Jay Kuo, Texture Analysis and Classification with Tree-Structured Wavelet Transform, IEEE Transactions on Image Processing, vol. 2, No. 4, Oct. 1993, © 1993 IEEE, pp. 429-441.

Chen, Yixin, James Z. Wang and Robert Krovetz, "Content-Based Image Retrieval by Clustering," MIR'03, Berkeley, California, © 2003 ACM Press, pp. 193-200.

Dhillon, Inderjit S., "Co-clustering documents and words using Bipartite Spectral Graph Partitioning," In KDD'01, San Francisco, California, pp. 269-274, © 2001 ACM.

Dhillon, Inderjit S., Subramanyam Mallela and Dharmendra S. Modha, "Information-Theoretic Co-clustering," SIGKDD'03, Aug. 2003, Washington, DC, pp. 89-98, © 2003 ACM.

Ding, Chris H.Q. et al., "A Min-max Cut Algorithm for Graph Partitioning and Data Clustering," Proc. IEEE Int'l Conf. Data Mining 2001, pp. 1-8.

Duda, Richard O., Peter E. Hart and David G. Stork, "Chapter 10 Unsupervised Learning and Clustering," Pattern Classification, Second Edition, © 2001 by John Wiley & Sons Inc., pp. 517-599.

Dumais, Susan T., "Chapter 4 Latent Semantic Analysis," Annual Review of Information Science and Technology (ARIST), vol. 38, Section II, Technology, 2004, pp. 189-230.

El-Yaniv, Ran and Oren Souroujon, "Iterative Double Clustering for Unsupervised and Semi-Supervised Learning," In Proceedings of ECML'01, pp. 121-132, 2001.

Freitas, Alex A., "A Critical Review of Multi-Objective Optimization in Data Mining: a position paper," SIGKDD Explorations, vol. 6, Issue 2, 2004, pp. 77-86.

Frenk, J.B.G. and S. Schaible, "Fractional Programming," Sep. 17, 2004, ERIM Report Series Reference No. ERS-2004-074-LIS, 55 pages, http://ssm.com/abstract=595012 [last accessed Nov. 29, 2006].

Fujisawa, Katsuki et al., "Numerical Evaluation of SDPA (SemiDefinite Programming Algorithm)," Revised Sep. 1998, 29 pages.

Gao, Bin et al., "Consistent Bipartite Graph Co-Partitioning for Star-Structured High-Order Heterogeneous Data Co-Clustering," Research Track Paper, KDD'05, Chicago, © 2005 ACM, pp. 41-50.

Gao, Bin et al., "Hierarchical Taxonomy Preparation for Text Categorization Using Consistent Bipartite Spectral Graph Co-partitioning," Sep. 2005, IEEE Transactions on Knowledge and Data Engineering, vol. 17, No. 9, © 2005 IEEE, pp. 1-11.

Gao, Bin et al., "Web Image Clustering by Consistent Utilization of Visual Features and Surrounding Texts," MM'05, Nov. 6-11, 2005, Singapore, © 2005 ACM, pp. 112-121.

Golub, Gene H. and Charles F. Van Loan, "Chpts. 2.5, 7.1, 8.1 & 8.7," Matrix Computations, Johns Hopkins University Press, 3rd edition, 1996, pp. 69-75, 310-320, 393-405 and 461-469.

Gordon, Shiri, Hayit Greenspan and Jacob Goldberger, "Applying the Information Bottleneck Principle to Unsupervised Clustering of Discrete and Continuous Image Representations," Proceedings of the Ninth IEEE International Conference on Computer Vision (ICCV 2003), © 2003 IEEE, 8 pages.

Hagen, Lars and Andrew B. Kahng, "New Spectral Methods for Ratio Cut Partitioning and Clustering," IEEE Transactions on Computer-Aided Design, vol. 11, Sep. 1992, © 1992 IEEE, pp. 1074-1085.

La Cascia, Marco et al., "Combining Textual and Visual Cues for Content-based Image Retrieval on the World Wide Web," IEEE Workshop on Content-based Access of Image and Video Libraries, Jun. 1998, 5 pages.

Li, Zhiwei et al., "Group WWW Image Search Results by Novel Inhomogeneous Clustering Method," In proceedings of the 11th International Multimedia Modelling Conference (MMM'05), © 2005 IEEE, 7 pages.

Long, Bo, Zhongfei (Mark) Zhang and Philip S. Yu, "Co-clustering by Block Value Decomposition," Research Track Poster, KDD'05, Aug. 21-24, 2005, Chicago, Illinois, pp. 635-640, © 2005 ACM.

Mao, Jianchang and Anil K. Jain, "Texture Classification and Segmentation Using Multiresolution Simultaneous Autoregressive Models," Jun. 20, 1991, Pattern Recognition, vol. 25, No. 2, © 1992 Pattern Recognition Society, pp. 173-188.

Pothen, Alex et al., "Partitioning Sparse Matrices with Eigenvectors of Graphs," Dec. 27, 1989, Siam J. Matrix Anal. Appl., vol. 11, No. 3, Jul. 1990, © 1990 Society for Industrial and Applied Mathematiocs, pp. 430-452.

Qiu, Guoping, "Image and Feature Co-Clustering," ICPR 4, 2004, pp. 991-994.

Rodden, Kerry et al., "Does Organisation by Similarity Assist Image Browsing?," SIGCHI'01, Seattle, © 2001 ACM, 8 pages.

Shi, Jianbo and Jitendra Malik, "Normalized Cuts and Image Segmentation," Nov. 16, 1999, IEEE Transactions on Pattern Analysis and Machine Intelligence, vol. 22, No. 8, Aug. 2000, © 2000 IEEE, pp. 888-905.

Slonim, Noam and Naftali Tishby, "Document Clustering using Word Clusters via the Information Bottleneck Method," SIGIR 2000, 7/00, Athens, Greece, pp. 208-215, © 2000 ACM.

Taeprasartsit, Pinyo and Liang Guo, "Texture Analysis and Classification with Tree-Structured Wavelet Transform," May 2, 2004, CSE/EE 585 Final Project, Spring 2004, pp. 1-24.

Wang, Jidong et al., "ReCoM: Reinforcement Clustering of Multi-Type Interrelated Data Objects," SIGIR'03, Jul. 28-Aug. 1, 2003, Toronto, Canada, pp. 274-281, © 2003 ACM.

Weisstein, Eric W., "Complex Conjugate," From MathWorld—A Wolfram Web Ressource, 3 pages, http://mathworld.wolfram.com/ComplexConjugate.html [last accessed Jan. 8, 2006].

Weisstein, Eric W., "Complex Number," From MathWorld—A Wolfram Web Resource, 4 pages, http://mathworld.wolfram.com/ComplexNumber.html [last accessed Nov. 30, 2006].

Weisstein, Eric W., "Conjugate Matrix," From MathWorld—A Wolfram Web Resource, 1 page, http://mathworld.wolfram.com/ConjugateMatrix.html [last accessed Jan. 8, 2006].

Weisstein, Eric W., "Conjugate Transpose," From MathWorld—A Wolfram Web Resource, 2 pages, http://mathworld.wolfram.com/ConjugateTranspose.html [last accessed Jan. 8, 2006].

Weisstein, Eric W., "Eigenvalue," From MathWorld—A Wolfram Web Resource, 3 pages, http://mathworld.wolfram.com/Eigenvalue.html [last accessed Jan. 8, 2006].

Weisstein, Eric W., "Eigenvector," From MathWorld—A Wolfram Web Resource, 3 pages, http://mathworld.wolfram.com/Eigenvector.html [last accessed Jan. 8, 2006].

Weisstein, Eric W., "Hermitian Matrix," From MathWorld—A Wolfram Web Resource, 2 pages, http://mathworld.wolfram.com/HermitianMatrix.html [last accessed Jan. 8, 2006].

Weisstein, Eric W., "Laplacian Matrix," From MathWorld—A Wolfram Web Resource, 1 page, http://mathworld.wolfram.com/LaplacianMatrix.html [last accessed Jan. 8, 2006].

Weisstein, Eric W., "Positive Semidefinite Matrix," From MathWorld—A Wolfram Web Resource, 1 page, http://mathworld.wolfram.com/PositiveSemidefiniteMatrix.html [last accessed Jan. 8, 2006].

Weisstein, Eric W., "Self-Adjoint Matrix," From MathWorld—A Wolfram Web Resource, 1 page, http://mathworld.wolfram.com/Self-AdjointMatrix.html [last accessed Jan. 8, 2006].

Zha, Hongyuan et al., "Bipartite Graph Partitioning and Data Clustering," In proceedings of CIKM'01, Atlanta, Georgia, © 2001 ACM, pp. 25-32.

Zhao, Rong and William I. Grosky, "Narrowing the Semantic Gap—Improved Text-Based Web Document Retrieval Using Visual Features," IEEE Transactions on Multimedia, vol. 4, No. 2, Jun. 2002, © 2002 IEEE, pp. 189-200.

* cited by examiner

US 7,461,073 B2

CO-CLUSTERING OBJECTS OF HETEROGENEOUS TYPES

BACKGROUND

In many applications, it can be very useful to identify groups or clusters of objects such that objects in the same cluster are similar while objects in different clusters are dissimilar. Such identification of groups is referred to as "clustering." Clustering has been used extensively to identify similar web-based objects. Web-based objects may include web pages, images, scientific articles, queries, authors, news reports, and so on. For example, when a collection of images is identified by a image search engine, the search engine may want to identify clusters of related images. The search engine may use various well-known algorithms including K-means, maximum likelihood estimation, spectral clustering, and so on. These algorithms generate clusters of homogeneous objects, that is, objects of the same type (e.g., generate clusters of images only or clusters of web pages only).

Recently, attempts have been made to cluster highly interrelated heterogeneous objects such as images and their surrounding text, documents and terms, customers and their purchased items, and so on. The goal of heterogeneous clustering is to identify clusters that contain related objects of two types. The use of homogeneous clustering on objects of each type separately may not be an acceptable basis for not heterogeneous clustering because the similarities among one type of objects sometimes can only be defined by the other type of objects. One attempt at co-clustering objects of two types tries to extend traditional spectral clustering algorithms using a bipartite spectral graph clustering algorithm to co-cluster documents and terms simultaneously. A similar attempt has been made at co-clustering heterogeneous objects in the field of biology and image processing. Some attempts have been made at high-order co-clustering, that is, co-clustering objects of more than two data types. However, such attempts have not used in an effective objective function nor is there sufficient evidence of the effectiveness of the iterative algorithms used by these attempts.

SUMMARY

A method and system for high-order co-clustering of objects of heterogeneous types using multiple bipartite graphs is provided. A clustering system represents relationships between objects of a first type and objects of a third type as a first bipartite graph and relationships between objects of a second type and objects of the third type as a second bipartite graph. The objects are represented as vertices, and the relationships are represented as edges of the bipartite graphs. The clustering system represents the first bipartite graph as a matrix with rows representing objects of the first type and columns representing objects of the third type and the second bipartite graph as a matrix with rows representing objects of the second type and columns representing objects of the third type. The elements of the matrices represent the weights of the relationship between the objects. The clustering system defines an objective function that specifies an objective of the clustering process that combines an objective for the first bipartite graph and an objective for the second bipartite graph. The clustering system solves the objective function and then applies a clustering algorithm such as the K-means algorithm to the solution to identify the clusters of heterogeneous objects.

The clustering system may solve the objective function by transforming the objective function to a semi-definite programming problem. The clustering system converts what would be a sum-of-ratios quadratic fractional programming problem to a quadratically constrained quadratic programming problem by simplifying the objective function. The simplified objective function is a quadratically constrained quadratic programming problem since all the constraints are convex and certain diagonal matrices are positive semi-definite. The clustering system then casts the quadratically constrained quadratic programming problem as a semi-definite programming problem by relaxing further constraints. The clustering system then uses one of a variety of algorithms for solving the semi-definite programming problem. The clustering system then applies a clustering algorithm such as a K-means algorithm to the solution to identify clusters of heterogeneous objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
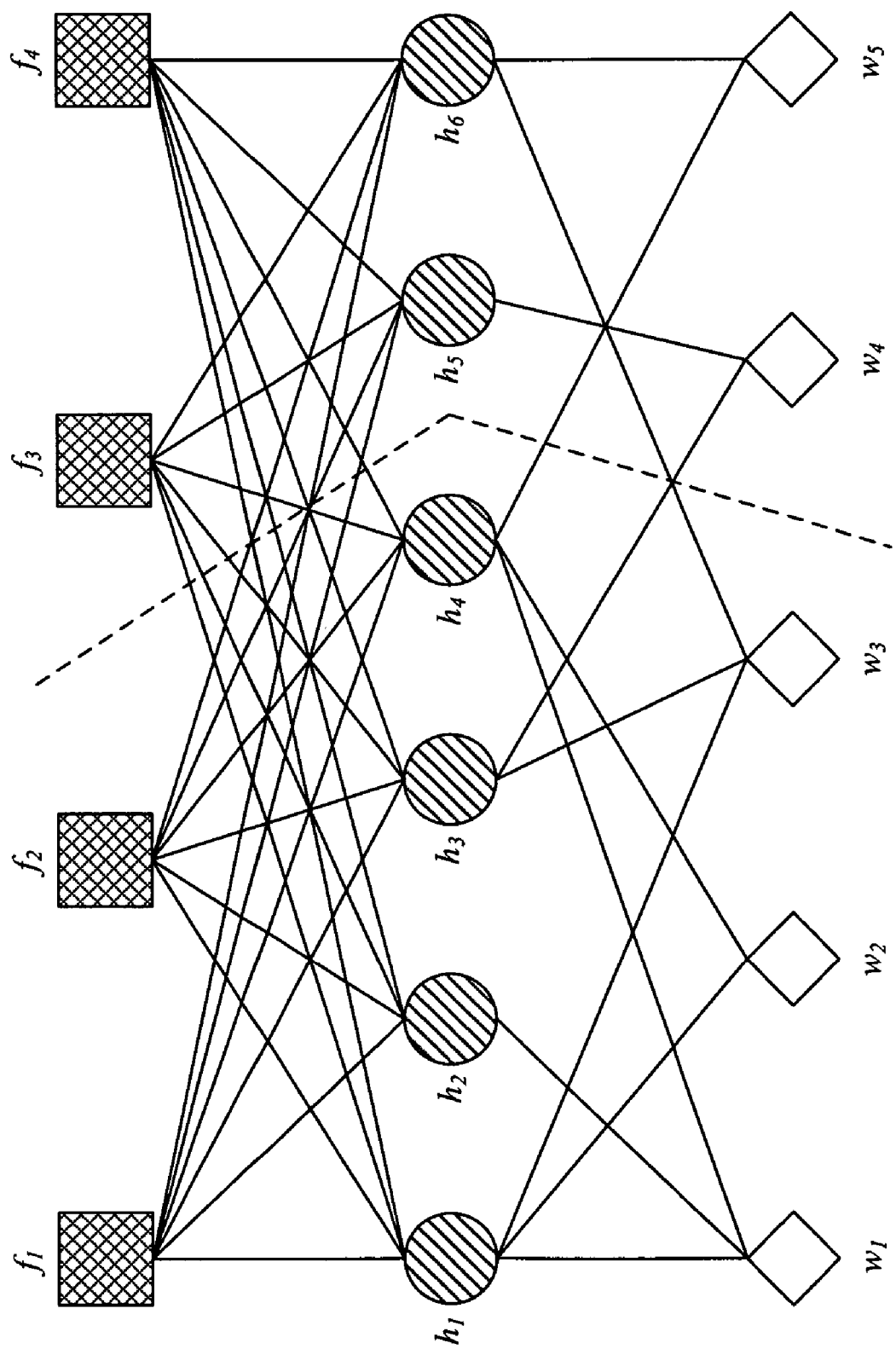
FIG. 1 is a diagram representing a tripartite graph illustrating relationships between low-level features, images, and text.

A method and system for high-order co-clustering of objects of heterogeneous types using multiple bipartite graphs is provided. In one embodiment, a clustering system represents relationships between objects of a first type and objects of a third type as a first bipartite graph and relationships between objects of a second type and objects of the third type as a second bipartite graph. The objects are represented as vertices, and the relationships are represented as edges of the bipartite graphs. For example, the third type of object may be an image, the first type of object may be a feature vector of visual features of the image, and the second type of object may be text surrounding the image on a web page. The clustering system represents the first bipartite graph as a matrix with rows representing objects of the first type and columns representing objects of the third type and the second bipartite graph as a matrix with rows representing objects of the second type and columns representing objects of the third type. The elements of the matrices represent the weights of the relationship between the objects. For example, an element of a matrix that maps documents to terms may contain the number of occurrences of the term within the documents. The clustering system thus transforms the high-order co-clustering to multiple pair-wise co-clusterings with the bipartite graphs. The clustering system defines an objective function that specifies an objective of the clustering process that combines an objective for the first bipartite graph and an objective for the second bipartite graph. In one embodiment, the objective function is cut-based based in that it specifies the objective in terms of the cut between the vertices of one cluster and the vertices of another cluster. One objective function would be to minimize the cut, that is, ensure that the relationships represented by the edges that are cut are minimized. Another objective function, referred to as "ratio cut," balances cluster sizes, and another objective function, referred to as "normalized cut," balances the cluster weights. In one embodiment, the clustering system uses a normalized cut objective function. The clustering system solves the objective function and then applies a clustering algorithm such as the K-means algorithm to the solution to identify the clusters of heterogeneous objects. The clustering system thus provides consistent bipartite graph co-partitioning.

In one embodiment, the clustering system solves the objective function by transforming the objective function to a semi-definite programming problem. The clustering system converts what would be a sum-of-ratios quadratic fractional programming problem to a quadratically constrained quadratic programming problem by simplifying the objective function. The simplified objective function is a quadratically constrained quadratic programming problem since all the constraints are convex and certain diagonal matrices are positive semi-definite. A positive semi-definite matrix is a square matrix with eigenvalues that are all non-negative and in which the matrix and its conjugate transpose are equal. The clustering system then casts the quadratically constrained quadratic programming problem as a semi-definite programming problem by relaxing further constraints. The clustering system then uses one of a variety of algorithms for solving the semi-definite programming problem. For example, the clustering system may use an interior-point method SDPA as described in Fujisawa, K., Fukuda, M., Kojima, M., and Nakata, K., "Numerical Evaluation of SDPA (SemiDefinite Programming Algorithm)," High Performance Optimization, Kluwer Academic Press, 267-301, 2000. The clustering system then applies a clustering algorithm such as a K-means algorithm to the solution to identify clusters of heterogeneous objects.

A normalized cut objective function is described in Shi, J. and Malik, J., "Normalized Cuts and Image Segmentation," IEEE Transactions on Pattern Analysis and Machine Intelligence, Vol. 22, No. 8, August 2000, which is hereby incorporated by reference. A normalized cut objective function is based on a disassociation measure that indicates that the cut cost is a fraction of the total edge connections to all the vertices in the graph and based on a normalized association measure within a cluster that indicates how tightly the vertices of a cluster are connected. The normalized cut objective function can be represented as follows:

$$\min \frac{q^T L q}{q^T D q}, \quad (1)$$
$$\text{s.t. } q^T D e = 0, q \neq 0$$

where $G=(V, E)$ represents a graph G with vertices V and edges E, the weights of the relationships are represented as:

$$M_{ij} = \begin{cases} E_{ij}, & \text{if } <i, j> \in E \\ 0, & \text{otherwise,} \end{cases} \quad (2)$$

D is a diagonal matrix represented as:

$$D = \Sigma_k E_{ik}, \quad (3)$$

L is a Laplacian matrix represented as:

$$L = D - M, \quad (4)$$

e is a column vector with all its elements equal to 1, q is a column vector with an element for each object with $q_i = c_1$ when i is an object in one cluster and $q_i = -c_2$ when i is an object in a second cluster and $c_1$ and $c_2$ are constants derived from D. The equation is subject to ("s.t.") the constraints as indicated. By relaxing the constraint of discrete values to continuous values, the solution for Equation 1 is the eigenvector corresponding to the second smallest eigenvalue $\lambda_2$ of the generalized eigenvalue problem as represented by the following:

$$Lq = \lambda Dq \quad (5)$$

FIG. 1 is a diagram representing a tripartite graph illustrating relationships between low-level features, images, and text, which are an example of different object types. The squares, circles, and diamonds represent low-level features $F=\{f_1, f_2, \ldots, f_m\}$, images $H=\{h_1, h_2, \ldots, h_n\}$, and terms in surrounding texts $W=\{w_1, w_2, \ldots, w_t\}$, respectively. The weight of an edge between low-level feature i and image j equals the value of low-level feature i in image j, while the weight of an edge between image j and term k equals the frequency of term k in the surrounding text of image j.

Figure 2:
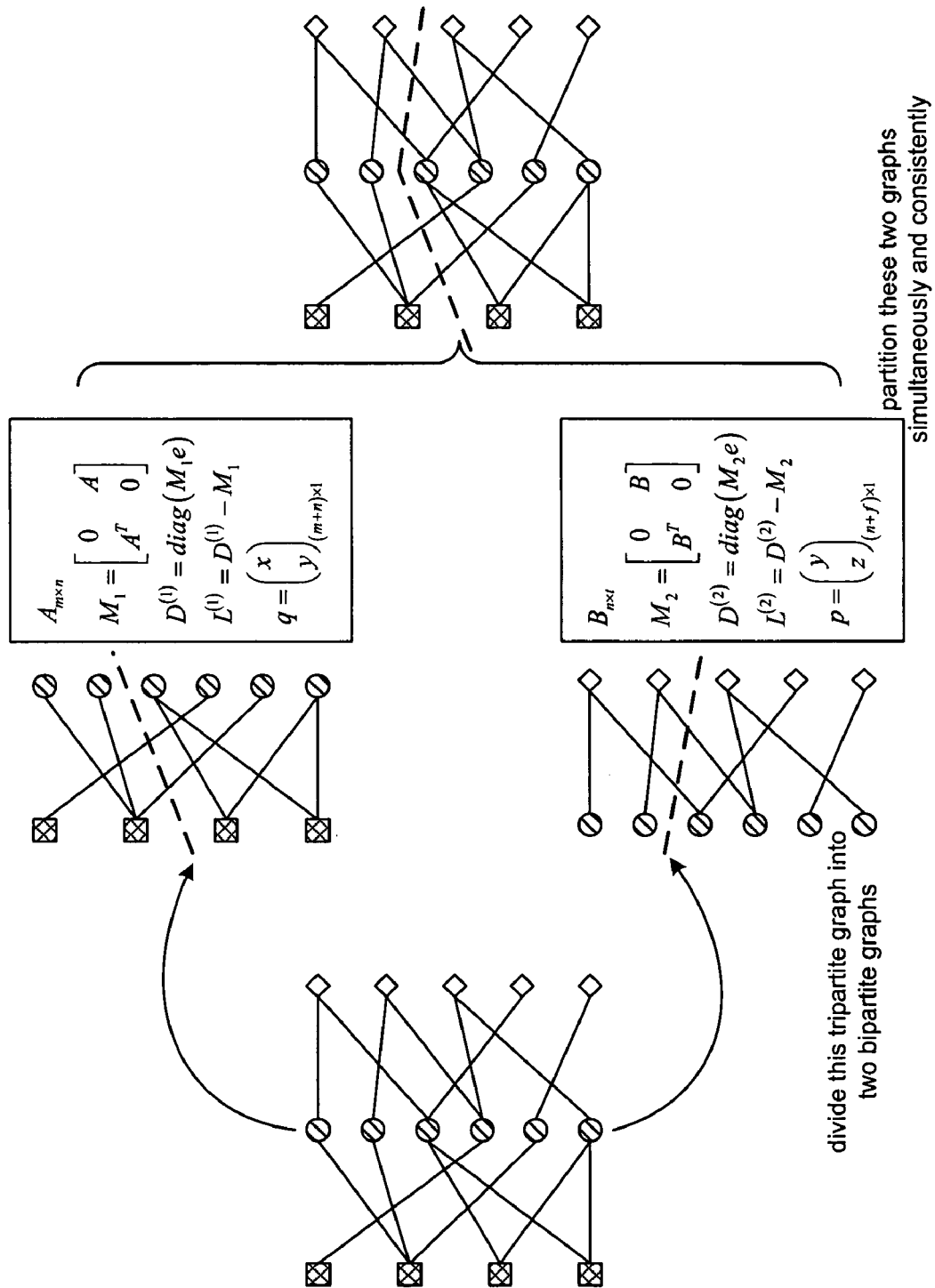
FIG. 2 illustrates the transforming of a tripartite graph into two bipartite graphs.

FIG. 2 illustrates the transforming of a tripartite graph into two bipartite graphs. The clustering system divides this tripartite graph into two bipartite graphs, which share the base objects of images. The clustering system thus transforms the original problem to the fusion of the pair-wise co-clustering problems over these two bipartite graphs. The clustering system attempts to find two clusters of images that provide a globally optimal solution to an objective function, that is, a combination of objective functions for each bipartite graph. Because the clustering system finds a globally optimal solution, the solution may not be locally optimal for each of the bipartite graphs individually. This clustering process is referred to as consistent bipartite graph co-partitioning ("CBGC").

In one embodiment, the clustering system bi-partitions the two bipartite graphs so that the three types objects are simultaneously clustered into two groups. In the following, f, h, and w represent column vectors of m, n, and t dimensions for visual features, images, and terms, respectively. The vectors of the bipartite graphs are represented as:

$$q = (f, h)^T \text{ and } p = (h, w)^T \quad (6)$$

A is a matrix representing the first bipartite graph and $a_{ij}$ is element ij of A, and B is a matrix representing the second bipartite graph and $b_{ij}$ is element ij of B, $D^{(f)}$ is a diagonal matrix represented as $$D^{(f)}_{ii} = \Sigma_k a_{ik}, \quad (7)$$

$D^{(w)}$ is a diagonal matrix represented as $$D^{(w)}_{ii} = \Sigma_k b_{ik}, \quad (8)$$

$L^{(f)}$ is a Laplacian matrix represented as $$L^{(f)}=D-A, \quad (9)$$

and $L^{(w)}$ is a Laplacian matrix represented as $$L^{(w)}=D-B. \quad (10)$$

The clustering system models a co-partitioning problem with multiple objective functions subject to constraints as represented by the following:

$$\min \frac{q^T L^{(f)} q}{q^T D^{(f)} q}$$
$$\min \frac{p^T L^{(w)} p}{p^T D^{(w)} p} \quad (11)$$
$$\text{s.t. (i) } q^T D^{(f)} e = 0, q \neq 0$$
$$\text{(ii) } p^T D^{(w)} e = 0, p \neq 0$$

The clustering system models the consistent co-partitioning problem by linearly combining the multiple local objective functions into a global objective function subject to constraints as follows:

$$\min \left[ \beta \frac{q^T L^{(f)} q}{q^T D^{(f)} q} + (1-\beta) \frac{p^T L^{(w)} p}{p^T D^{(w)} p} \right] \quad (12)$$
$$\text{s.t. (i) } q^T D^{(f)} e = 0, q \neq 0$$
$$\text{(ii) } p^T D^{(w)} e = 0, p \neq 0$$
$$\text{(iii) } 0 < \beta < 1$$

where $\beta$ is a weighting parameter indicating the relative weight to be given the relationships of the bipartite graphs.

To solve the combined objective function, the clustering system sets $\omega = (f, h, w)^T$ to be a vector representing the combination of features, images, and terms s=m+n+t dimensions. The clustering system then extends matrices $L^{(f)}$, $L^{(w)}$, $D^{(f)}$, and $D^{(w)}$ to adopt the dimension of $\omega$ as follows:

$$\Gamma_1 = \begin{bmatrix} L^{(f)} & 0 \\ 0 & 0 \end{bmatrix}_{s \times s}, \Gamma_2 = \begin{bmatrix} 0 & 0 \\ 0 & L^{(w)} \end{bmatrix}_{s \times s} \quad (13)$$

$$\Pi_1 = \begin{bmatrix} D^{(f)} & 0 \\ 0 & 0 \end{bmatrix}_{s \times s}, \Pi_2 = \begin{bmatrix} 0 & 0 \\ 0 & D^{(w)} \end{bmatrix}_{s \times s} \quad (14)$$

The objective function can be written subject to constraints as follows:

$$\min \left[ \beta \frac{\omega^T \Gamma_1 \omega}{\omega^T \Pi_1 \omega} + (1-\beta) \frac{\omega^T \Gamma_2 \omega}{\omega^T \Pi_2 \omega} \right] \quad (15)$$
$$\text{s.t. (i) } \omega^T \Pi_1 e = 0$$
$$\text{(ii) } \omega^T \Pi_2 e = 0$$

-continued $$\text{(iii) } \omega \neq 0, 0 < \beta < 1$$

This equation represents a sum-of-ratios quadratic fractional programming problem, which is hard and complicated to solve although there have been some branch-and-bound algorithms. To avoid solving this fractional programming problem, the clustering system uses spectral clustering to simplify the objective function by fixing the values of the denominators in Equation 15 to $e^T \Pi_1 e$ and $e^T \Pi_2 e$, respectively. The objective function subject to constraints can then be rewritten as follows:

$$\min \omega^T \Gamma \omega$$
$$\text{s.t. (i) } \omega^T \Pi_1 \omega = e^T \Pi_1 e$$
$$\text{(ii) } \omega^T \Pi_2 \omega = e^T \Pi_2 e$$
$$\text{(iii) } \omega^T \Pi_1 e = 0$$
$$\text{(iv) } \omega^T \Pi_2 e = 0 \quad (16)$$

where $$\Gamma = \frac{\beta}{e^T \Pi_1 e} \Gamma_1 + \frac{1-\beta}{e^T \Pi_2 e} \Gamma_2, 0 < \beta < 1 \quad (17)$$

The optimization problem of Equation 16 is a quadratically constrained quadratic programming ("QCQP") problem since all the constraints are convex and matrices $\Pi_1$ and $\Pi_2$ are both positive semi-definite. A convex QCQP problem can be cast in the form of a semi-definite programming problem ("SDP") to reduce the computational complexity of finding a solution. SDP is an optimization problem with a form as follows:

$$\min C \square W$$
$$\text{s.t. (i) } A_i \square W = b_i, i=1, \ldots, k$$
$$\text{(ii) W is positive semi-definite} \quad (18)$$

where C is a symmetric coefficient matrix and W is a symmetric parameter matrix; $A_i$ (and $b_i$), i=1, ..., k are coefficient matrices (and vectors) for the constraints; and the matrix inner-product is defined as:

$$C \square W = \sum_{i,j} C_{ij} W_{ij} \quad (19)$$

The clustering system reformulates this QCQP problem as an SDP problem by relaxing the product terms $w_i w_j$ to an element $\Omega_{ij}$ of a symmetric matrix $\Omega$:

$$\min_{\omega, \Omega} \begin{bmatrix} 0 & 0 \\ 0 & \Gamma \end{bmatrix} \cdot \begin{bmatrix} 1 & \omega^T \\ \omega & \Omega \end{bmatrix} \quad (20)$$

$$\text{s.t. (i) } \begin{bmatrix} -e^T \Pi_1 e & 0 \\ 0 & \Pi_1 \end{bmatrix} \cdot \begin{bmatrix} 1 & \omega^T \\ \omega & \Omega \end{bmatrix} = 0$$

-continued (ii) $\begin{bmatrix} -e^T\Pi_2 e & 0 \\ 0 & \Pi_2 \end{bmatrix} \cdot \begin{bmatrix} 1 & \omega^T \\ \omega & \Omega \end{bmatrix} = 0$ (iii) $\begin{bmatrix} 0 & e^T\Pi_1/2 \\ \Pi_1 e/2 & 0 \end{bmatrix} \cdot \begin{bmatrix} 1 & \omega^T \\ \omega & \Omega \end{bmatrix} = 0$ (iv) $\begin{bmatrix} 0 & e^T\Pi_2/2 \\ \Pi_2 e/2 & 0 \end{bmatrix} \cdot \begin{bmatrix} 1 & \omega^T \\ \omega & \Omega \end{bmatrix} = 0$ (v) $\begin{bmatrix} 1 & \omega^T \\ \omega & \Omega \end{bmatrix}$ is positive semi-definite Since the SDP relaxation of a QCQP problem may produce an approximation to the original problem with a good error bound, the clustering system relaxes the constraints of $\Omega = w_i w_j$ with the objective function as follows:

$$\min_{\omega} \begin{bmatrix} 0 & 0 \\ 0 & \Gamma \end{bmatrix} \cdot W \quad (21)$$

s.t. (i) $\begin{bmatrix} -e^T\Pi_1 e & 0 \\ 0 & \Pi_1 \end{bmatrix} \cdot W = 0$ (ii) $\begin{bmatrix} -e^T\Pi_2 e & 0 \\ 0 & \Pi_2 \end{bmatrix} \cdot W = 0$ (iii) $\begin{bmatrix} 0 & e^T\Pi_1/2 \\ \Pi_1 e/2 & 0 \end{bmatrix} \cdot W = 0$ (iv) $\begin{bmatrix} 0 & e^T\Pi_2/2 \\ \Pi_2 e/2 & 0 \end{bmatrix} \cdot W = 0$ (v) $\begin{bmatrix} 1 & 0 \\ 0 & 0 \end{bmatrix} \cdot W = 1$ (vi) $\begin{bmatrix} 0 & e \\ e & 0 \end{bmatrix} \cdot W = \theta_1$ (vii) $\begin{bmatrix} 0 & e \\ e & E \end{bmatrix} \cdot W = \theta_2$ (viii) $W$ is positive semi-definite where E is a matrix block with all the elements equal to one, the constraint (v) ensures that $W_{ij}=1$, and the constraints (vi) and (vii) are bound controllers with some constants $\theta_1$ and $\theta_2$.

The objective function of Equation 21 represents a standard SDP problem. The first column of W (except $W_{ij}$) can be regarded as the representation of $\omega$. The objective function can be solved using various iterative algorithms such as an interior-point method SDPA to identify $\omega$. The clustering system can then use various clustering techniques of $\omega$ to identify the clusters.

The clustering system can be adapted to perform co-clustering for more than three different types of heterogeneous objects. If k different types of objects are to be co-clustered, then the k-partite graph can be divided into k−1 bipartite graphs. The clustering system represents the objective function as the following:

$$\begin{cases} \min \sum_{i=1}^{k-1} \beta_i \frac{q_i^T L^{(i)} q_i}{q_i^T D^{(i)} q_i} \\ \text{s.t. (i) } q_i^T D^{(i)} e = 0, q_i \neq 0, i = 1, \ldots, k-1' \\ \text{(ii) } \sum_{i=1}^{k-1} \beta_i = 1, 0 < \beta_i < 1 \end{cases} \quad (22)$$

where $q_i$, $i=1, \ldots, k-1$ are indicating vectors for the local bipartite graphs. The clustering system can transform Equation 22 to a QCQP problem that is solved as a SDP problem.

Figure 3:
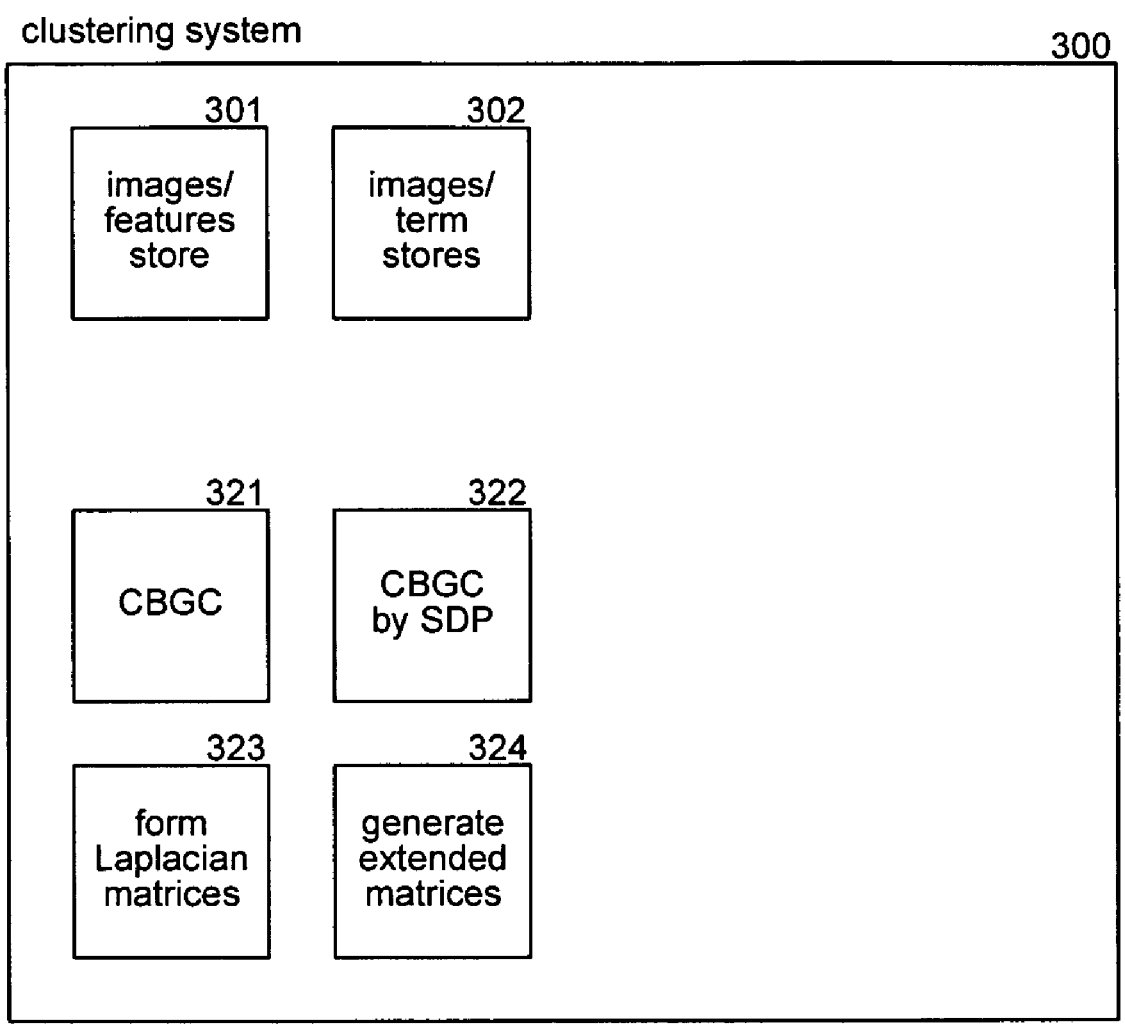
FIG. 3 is a block diagram illustrating components of the clustering system in one embodiment.

FIG. 3 is a block diagram illustrating components of the clustering system in one embodiment. The clustering system 300 includes object relationships stores such as images/features store 311 and images/terms store 312. Each object relationships store indicates the relationship between objects of a base object type (e.g., images) and objects of another object type (e.g., features). The object relationships stores may be generated by various components (not illustrated) such as an image crawler that crawls the web for images and surrounding text. The image crawler then identifies low-level features of the images and stores the information in the images/features store. The image crawler may count the number of occurrences of terms of the surrounding text and store the number as weights in the images/terms store. The clustering system also includes a consistent bipartite graph co-partitioning component 321, a consistent bipartite graph co-partitioning by semi-definite programming component 322, a form Laplacian matrices component 323, and a generate extended matrices component 324. The CBGC component identifies clusters by solving the objective function of Equation 12. The CBGC by SDP component identifies clusters by solving the objective function of Equation 16 represented as a semi-definite programming problem. The form Laplacian matrices component is invoked to generate the Laplacian matrices for the bipartite graphs of object relationships. The generate extended matrices component is invoked to generate the extended matrices for reformulation of the objective function to an SDP problem.

The computing devices on which the clustering system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the clustering system. In addition, the data structures and message structures may be stored or transmitted via a data transmission medium, such as a signal on a communications link. Various communications links may be used, such as the Internet, a local area network, a wide area network, or a point-to-point dial-up connection to connect the clustering system to other devices (e.g., web servers).

The clustering system may be used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
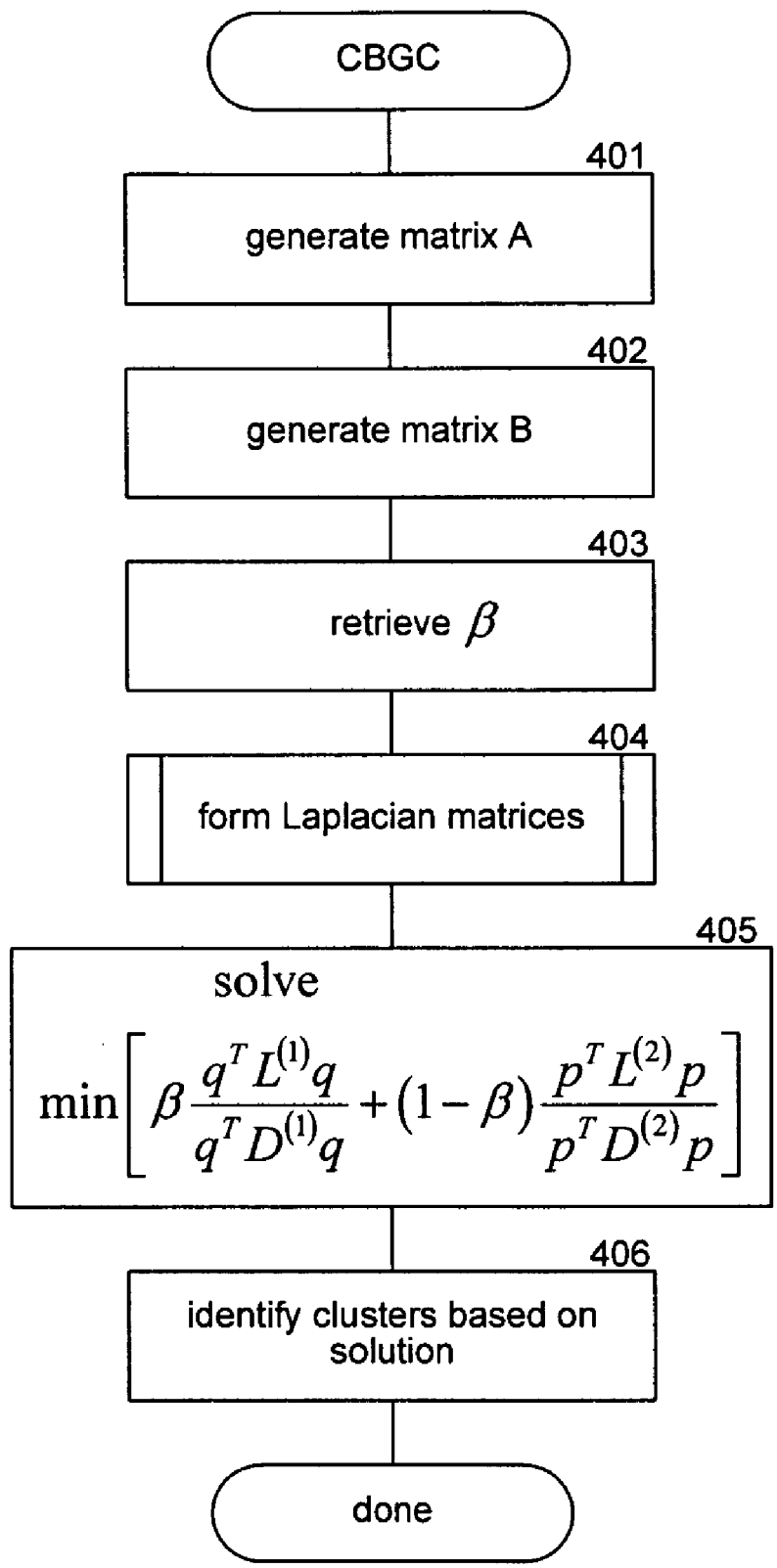
FIG. 4 is a flow diagram illustrating processing of the CBGC component of the clustering system in one embodiment.

FIG. 4 is a flow diagram illustrating processing of the CBGC component of the clustering system in one embodiment. The component is passed information of the object relationships stores. In block 401, the component generates the matrix A representing the relationship between objects of a base object type (e.g., images) and objects of another object type (e.g., features). In block 402, the component generates the matrix B representing the relationship between objects of a base object type and objects of another object type (e.g., terms). In block 403, the component retrieves the weight for linearly combining the local objective functions. In block 404, the component invokes the form Laplacian matrices component to form the matrices D and L for matrices A and B. In block 405, the component solves Equation 12. In block 406, the component identifies the clusters based on the solution to the equation. The component then completes.

Figure 5:
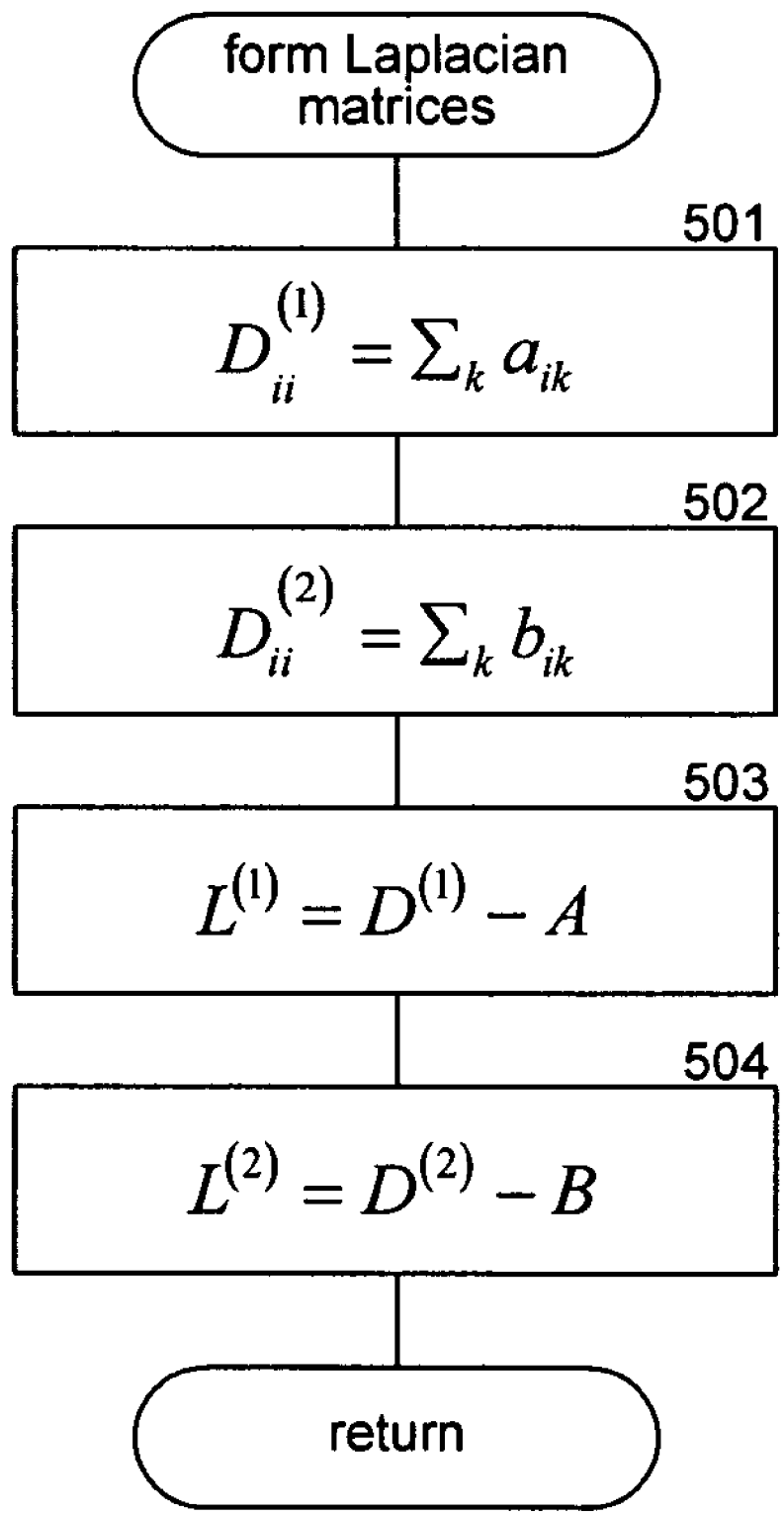
FIG. 5 is a flow diagram that illustrates the processing of the form Laplacian matrices component of the clustering system in one embodiment.

FIG. 5 is a flow diagram that illustrates the processing of the form Laplacian matrices component of the clustering system in one embodiment. The component is passed matrices A and B. In block 501, the component forms the diagonal matrix A as defined by Equation 3. In block 502, the component forms the diagonal matrix for matrix B as defined by Equation 3. In block 503, the component forms the Laplacian matrix for matrix A as defined by Equation 4. In block 504, the component forms the Laplacian matrix for matrix B as defined by Equation 4. The component then returns.

Figure 6:
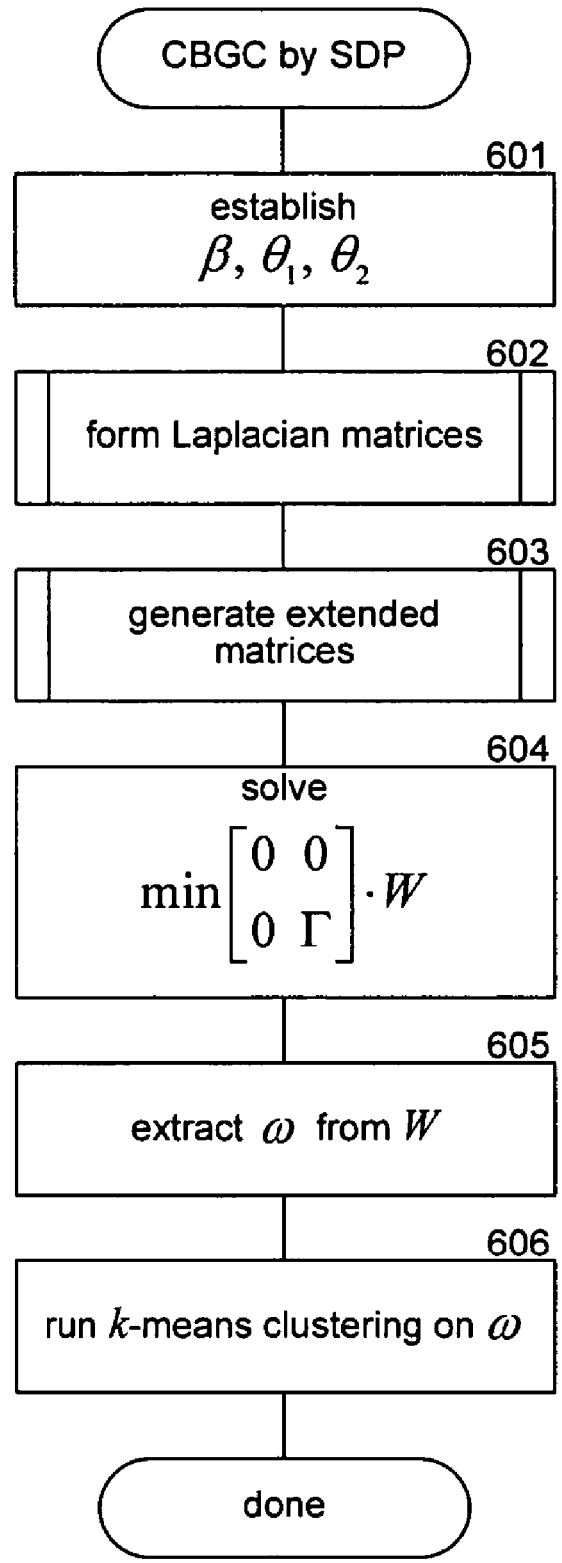
FIG. 6 is a flow diagram that illustrates the processing of the CBGC by SDP component of the clustering system in one embodiment.

FIG. 6 is a flow diagram that illustrates the processing of the CBGC by SDP component of the clustering system in one embodiment. The component is passed the information of the object relationships stores. In block 601, the component retrieves a weight for linearly combining the local objective functions and parameters for the SDP problem. In block 602, the component invokes the form Laplacian matrices component. The invoked component generates the diagonal matrices and Laplacian matrices $D^{(f)}$, $D^{(w)}$, $L^{(f)}$, and $L^{(w)}$ for the relationship matrices A and B. In block 603, the component invokes the generate extended matrices component. The invoked component extends matrices $D^{(f)}$, $D^{(w)}$, $L^{(f)}$, and $L^{(w)}$ to matrices $\Pi_1$, $\Pi_2$, $\Gamma_1$, and $\Gamma_2$, and forms $\Gamma$, as defined by Equations 13 and 14. In block 604, the component solves Equation 16 using the interior-point method SDP. In block 605, the component extracts the vector $\omega$. In block 606, the component performs a K-means clustering on the vector. The component then completes.

Figure 7:
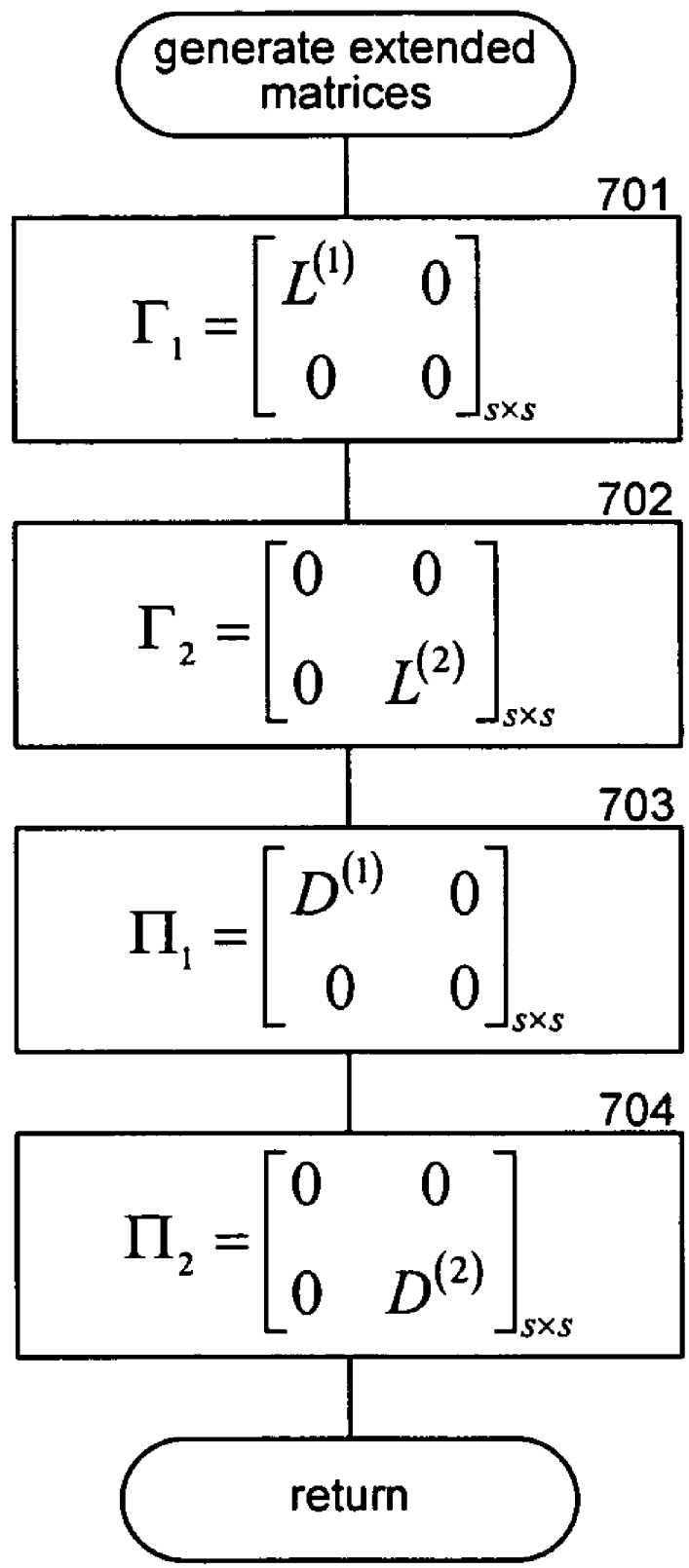
FIG. 7 is a flow diagram that illustrates the processing of the generate extended matrices component of the clustering system in one embodiment.

FIG. 7 is a flow diagram that illustrates the processing of the generate extended matrices component of the clustering system in one embodiment. In blocks 701-702, the component generates the extended matrices for the Laplacian transforms. In blocks 703-704, the component generates the extended matrices for the diagonals. The component then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

What is claimed is:

1. A computing system with a processor and memory for co-clustering objects of heterogeneous types, comprising:

a component that represents relationships between objects of a first type and objects of a third type as a first bipartite graph;

a component that represents relationships between objects of a second type and objects of the third type as a second bipartite graph;

a component that provides a cut-based objective function representing relationships across cuts for both the first bipartite graph and the second bipartite graph;

a component that finds a solution to the cut-based objective function; and a component that identifies clusters of objects from the solution to the objective function where the cut-based objective function is represented as:

$$\min\left[\beta\frac{q^T L^{(1)} q}{q^T D^{(1)} q} + (1-\beta)\frac{p^T L^{(2)} p}{p^T D^{(2)} p}\right]$$

s.t. (i) $q^T D^{(1)} e = 0, q \neq 0$ (ii) $p^T D^{(2)} e = 0, p \neq 0$ (iii) $0 < \beta < 1$ where A is a matrix representing the first bipartite graph and $a_{ij}$ is element i and j of A, B is a matrix representing the second bipartite graph and $b_{ij}$ is element i and j of B, $D^{(1)}$ is a diagonal matrix represented as $D^{(1)}_{ii} = \Sigma_k a_{ik}$, $D^{(2)}$ is a diagonal matrix represented as $D^{(2)}_{ii} = \Sigma_k b_{ik}$, $L^{(1)}$ is a Laplacian matrix represented as $L^{(1)} = D - A$, $L^{(2)}$ is a Laplacian matrix represented as $L^{(2)} = D - B$, e is a column vector with all its elements equal to 1, q is a column vector with $q_i = c_1$ when i is an object in one cluster and $q_i = -c_2$ when i is an object in a secoid cluster, $p_i = c_1$ when i is an object in one cluster and $p_i = -c_2$ when i is an: object in a second cluster, and $\beta$ represents a weight of the relationships of the first bipartite graph and the second bipartite graph.

2. The system of claim 1 wherein the cut-based objective function is a normalized cut objective function.

3. The system of claim 1 wherein the cut-based objective function is solved using semi-definite programming.

4. The system of claim 1 wherein vertices of the graphs represent objects and edges represent relationships between objects.

5. The system of claim 1 wherein the cut-based objective function is solved using semi-definite programming.

6. The system of claim 1 wherein the types of objects include images, visual features, and surrounding text.

7. The system of claim 1 wherein the types of objects include users, queries, and search results.

8. The system of claim 1 wherein the types of objects include documents, authors, and keywords.

9. The system of claim 1 including representing relationships between objects of the third type and objects of other types using bipartite graphs and extending the cut-based objective function to encompass the additional bipartite graphs.

10. A computing system with a processor and memory for solving an objective function for consistent bipartite graph co-partitioning, comprising:
- a component that provides object matrices, each representing a bipartite graph representing relationships between objects of different types where vertices represent objects and edges represent relationships;
- a component that generates diagonal and Laplacian matrices for the object matrices;
- a component that generates extended matrices based on the diagonal and Laplacian matrices;
- a component that solves a cut-based objective function represents relationships across cuts for each of the bipartite graphs using the extended matrices using semi-definite programming;
- a component that identifies clusters of objects from the solution; and
- wherein the objective function is represented as:

$$\min\left[\beta\frac{\omega^T \Gamma_1 \omega}{\omega^T \Pi_1 \omega} + (1-\beta)\frac{\omega^T \Gamma_2 \omega}{\omega^T \Pi_2 \omega}\right]$$

s.t. (i) $\omega^T \Pi_1 e = 0$
(ii) $\omega^T \Pi_2 e = 0$
(iii) $\omega \neq 0, 0 < \beta < 1$ where $$\Gamma_1 = \begin{bmatrix} L^{(1)} & 0 \\ 0 & 0 \end{bmatrix}_{s\times s}, \Gamma_2 = \begin{bmatrix} 0 & 0 \\ 0 & L^{(2)} \end{bmatrix}_{s\times s}$$

$$\Pi_1 = \begin{bmatrix} D^{(1)} & 0 \\ 0 & 0 \end{bmatrix}_{s\times s}, \Pi_2 \begin{bmatrix} 0 & 0 \\ 0 & D^{(2)} \end{bmatrix}_{s\times s}$$

where A is a matrix representing the first bipartite graph and $a_{ij}$ is element i and j of
A, B is a matrix representing the second bipartite graph and $b_{ij}$ is element i and j of
B, $D^{(1)}$ is a diagonal matrix represented as $$D^{(1)}_{ii} = \Sigma_k a_{ik},$$

$D^{(2)}$ is a diagonal matrix represented as $$D^{(2)}_{ii} = \Sigma_k b_{ik},$$

$L^{(1)}$ is a Laplacian matrix represented as $$L^{(1)} = D - A,$$

$L^{(2)}$ is a Laplacian matrix represented as $$L^{(2)} = D - B,$$

e is a column vector with all its elements equal to 1, q is a column vector with $q_i = c_1$ when i is an object in one cluster and $q_i = -c_2$ when i is an object in a second cluster, $p_i = c_1$ when i is an object in one cluster and $p_i = -c_2$ when i is an object in a second cluster, and β represents a weight of the relationships of the first bipartite graph and the second bipartite graph.

11. The system of claim 10 wherein the component that solves the cut-based objective function does so by reformulating a quadratically constrained quadratic programming problem into a semi-definite programming problem.

12. The system of claim 11 wherein the reformulating includes relaxing the product terms $w_i w_j$ to an element $\Omega_{ij}$ of a symmetric matrix $\Omega$.

13. The system of claim 12 wherein the semi-definite programming problem is represented as follows:

$$\min_{\omega,\Omega} \begin{bmatrix} 0 & 0 \\ 0 & \Gamma \end{bmatrix} \cdot \begin{bmatrix} 1 & \omega^T \\ \omega & \Omega \end{bmatrix}$$

s.t. (i) $\begin{bmatrix} -e^T \Pi_1 e & 0 \\ 0 & \Pi_1 \end{bmatrix} \cdot \begin{bmatrix} 1 & \omega^T \\ \omega & \Omega \end{bmatrix} = 0$ (ii) $\begin{bmatrix} -e^T \Pi_2 e & 0 \\ 0 & \Pi_2 \end{bmatrix} \cdot \begin{bmatrix} 1 & \omega^T \\ \omega & \Omega \end{bmatrix} = 0$ (iii) $\begin{bmatrix} 0 & e^T \Pi_1/2 \\ \Pi_1 e/2 & 0 \end{bmatrix} \cdot \begin{bmatrix} 1 & \omega^T \\ \omega & \Omega \end{bmatrix} = 0$ (iv) $\begin{bmatrix} 0 & e^T \Pi_2/2 \\ \Pi_2 e/2 & 0 \end{bmatrix} \cdot \begin{bmatrix} 1 & \omega^T \\ \omega & \Omega \end{bmatrix} = 0$ (v) $\begin{bmatrix} 1 & \omega^T \\ \omega & \Omega \end{bmatrix}$ is positive semi-definite.

14. The system of claim 13 wherein approximating the semi-definite programming problems by relaxing the constraint of $\Omega = w_i w_j$ is represented as:

$$\min_\omega \begin{bmatrix} 0 & 0 \\ 0 & \Gamma \end{bmatrix} \cdot W$$

s.t. (i) $\begin{bmatrix} -e^T \Pi_1 e & 0 \\ 0 & \Pi_1 \end{bmatrix} \cdot W = 0$ (ii) $\begin{bmatrix} -e^T \Pi_2 e & 0 \\ 0 & \Pi_2 \end{bmatrix} \cdot W = 0$ (iii) $\begin{bmatrix} 0 & e^T \Pi_1/2 \\ \Pi_1 e/2 & 0 \end{bmatrix} \cdot W = 0$ (iv) $\begin{bmatrix} 0 & e^T \Pi_2/2 \\ \Pi_2 e/2 & 0 \end{bmatrix} \cdot W = 0$ (v) $\begin{bmatrix} 1 & 0 \\ 0 & 0 \end{bmatrix} \cdot W = 1$ (vi) $\begin{bmatrix} 0 & e \\ e & 0 \end{bmatrix} \cdot W = \theta_1$ (vii) $\begin{bmatrix} 0 & e \\ e & E \end{bmatrix} \cdot W = \theta_2$ (viii) W is positive semi-definite where E is a matrix block with all the elements equal to one the constraint (v) ensures that $W_{ij} = 1$, and the constraints (vi) and (vii) are bound controllers with some constants θ and $\theta_2$.

15. The system of claim 10 wherein the types of objects include images, visual features, and surrounding text.

16. The system of claim 10 wherein the types of objects include users, queries, and search results.

17. A computer-readable storage medium containing instructions for controlling a computing device to co-cluster objects of heterogeneous types, by a method comprising:
- representing relationships between objects of a first type and objects of a third type as a first bipartite graph;
- representing relationships between objects of a second type and objects of the third type as a second bipartite graph;
- providing a cut-based objective function representing relationships across cuts for both the first bipartite graph and the second bipartite graph;

solving the cut-based objective function using semi-definite programming;
identifying clusters of objects from the solution to the objective function; and
where the cut-based objective function is represented as:

$$\min\left[\beta\frac{q^T L^{(1)} q}{q^T D^{(1)} q} + (1-\beta)\frac{p^T L^{(2)} p}{p^T D^{(2)} p}\right]$$

$$s.t. \quad (i)\ q^T D^{(1)} e = 0,\ q \neq 0$$
$$(ii)\ p^T D^{(2)} e = 0,\ p \neq 0$$
$$(iii)\ 0 < \beta < 1$$

is where A is a matrix representing the first bipartite graph and $a_{ij}$ is element i and j of A, B a matrix representing the second bipartite graph and $b_{ij}$ is element i and j of B, D(1) is a diagonal matrix represented as $$D^{(1)}_{ij} = \Sigma_k a_{ik},$$

$D^{(2)}$ is a diagonal matrix represented as $$D^{(2)}_{ij} = \Sigma_k b_{ik},$$

$L^{(1)}$ is a Laplacian matrix represented as $$L^{(1)} = D - A,$$

$L^{(2)}$ is a Laplacian matrix represented as $$L^{(2)} = D - B,$$

e is a column vector with all its elements equal to 1, q is a column vector with $q_i = c_1$ when i is an object in one cluster and $q_i = -c_2$ when i is an object in a second cluster, $p_i = c_1$ when i is an object in one cluster and $p_i = -c_2$ when i is an object in a second cluster, and $\beta$ represents a weight of the relationships of the first bipartite graph and the second bipartite graph.

18. The computer-readable storage medium of claim 17 wherein the cut-based objective function is a normalized cut objective function.

* * * * *